United States Patent
Suzuki

(10) Patent No.: US 8,405,749 B2
(45) Date of Patent: Mar. 26, 2013

(54) SOLID-STATE IMAGING DEVICE, DATA TRANSFER CIRCUIT, AND CAMERA SYSTEM FOR COMPENSATING FOR CIRCUIT VARIATIONS DURING IMAGE READOUT

(75) Inventor: Misao Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/989,207

(22) PCT Filed: May 25, 2009

(86) PCT No.: PCT/JP2009/059928
§ 371 (c)(1),
(2), (4) Date: Oct. 22, 2010

(87) PCT Pub. No.: WO2009/145331
PCT Pub. Date: Dec. 3, 2009

(65) Prior Publication Data
US 2011/0037871 A1     Feb. 17, 2011

(30) Foreign Application Priority Data
May 27, 2008   (JP) .................................. 2008-138513

(51) Int. Cl.
*H04N 3/14*        (2006.01)
*H04N 5/335*       (2011.01)
(52) U.S. Cl. ......................... 348/302; 713/401; 713/503
(58) Field of Classification Search ............ 348/207.99, 348/222.1, 294–324; 257/222, 223, 225–234, 257/257, 258, 291, 292, 294, 431–448; 358/482, 358/483, 513, 514; 377/57–63; 250/208.1; 365/194; 711/167; 713/401, 503; 714/738
See application file for complete search history.

(56) References Cited

U.S. PATENT DOCUMENTS 5,917,760 A  *   6/1999  Millar ........................... 365/194
(Continued)

FOREIGN PATENT DOCUMENTS
JP     10-032757       2/1998
JP     2000-250651     9/2000
(Continued)

*Primary Examiner* — Nelson D. Hernández Hernández
*Assistant Examiner* — Dennis Hogue
(74) *Attorney, Agent, or Firm* — Robert J. Depke; The Chicago Technology Law Group, LLC

(57)     ABSTRACT

To make it possible to appropriately set a capturing timing for a pixel value.
For this, the present invention includes a pixel array unit 2 composed of pixels 21 arranged in a row direction and a column direction in a matrix manner and a latch unit 62 provided for each column constituting the pixel array unit 2 and configured to convert a pixel value of the pixel 21 into a digital pixel value to hold the pixel value. Also, the present invention includes a column scanning unit 4 for selecting the latch unit 62, a capturing unit 9 for sequentially capturing the pixel value held by the latch unit selected by the column scanning unit 4 in synchronism with a predetermined clock, and a delay unit 10 for delaying a clock for driving the capturing unit 9 in a plurality of stages. With the configuration described above, first dummy data is set in the latch unit 62-m at the near end, and second dummy data is set in the latch unit 62-0 at the far end. Then, a delay amount in the delay unit 10 is set as a delay amount at which both the first dummy data and the second dummy data can be captured by the capturing unit 9.

9 Claims, 6 Drawing Sheets

U.S. PATENT DOCUMENTS

| | | | |
|---|---|---|---|
| 6,253,333 B1 * | 6/2001 | Bogumil et al. | 713/503 |
| 6,269,451 B1 * | 7/2001 | Mullarkey | 713/401 |
| 7,129,883 B2 | 10/2006 | Muramatsu et al. | |
| 2003/0005250 A1 * | 1/2003 | Johnson et al. | 711/167 |
| 2004/0003331 A1 * | 1/2004 | Salmon et al. | 714/738 |
| 2005/0062864 A1 * | 3/2005 | Mabuchi | 348/294 |
| 2005/0231624 A1 | 10/2005 | Muramatsu et al. | |

FOREIGN PATENT DOCUMENTS

| | | |
|---|---|---|
| JP | 2001-175353 | 6/2001 |
| JP | 2001-216047 | 8/2001 |
| JP | 2003-271447 | 9/2003 |
| JP | 2006-115269 | 4/2006 |

* cited by examiner

SOLID-STATE IMAGING DEVICE, DATA TRANSFER CIRCUIT, AND CAMERA SYSTEM FOR COMPENSATING FOR CIRCUIT VARIATIONS DURING IMAGE READOUT

This application is a 371 U.S. National Stage filing of PCT/JP2009/059928, filed May 25, 2009, which claims priority to Japanese Patent Application Number 2008-138513 filed May 27, 2008, all of which are incorporated herein by reference.

TECHNICAL FIELD

The present invention relates to a solid-state image pickup element and a data transfer circuit for transferring a pixel value obtained by the solid-state image pickup element, as well as a camera system into which the solid-state image pickup element is incorporated, and particularly relates to a technology of adjusting a capturing timing for the pixel value in the solid-state image pickup element.

BACKGROUND ART

Up to now, as a solid-state image pickup element, a CMOS (Complementary Metal Oxide Semiconductor) type image sensor is known. As the CMOS image sensor is fabricated on a base of a CMOS LSI manufacturing process, it is possible to easily incorporate a function other the image sensor in the same chip through an application of this process. By utilizing this characteristic, an analog digital converter (which will be hereinafter referred to as ADC) is provided for each column of pixels, and a conduct of a conversion processing into a digital signal is performed in parallel in the respective columns. This system is referred to as column ADC system.

FIG. 1 shows a configuration example of a solid-state image pickup element for performing an A/D (Analog/Digital) conversion through the column ADC system. This solid-state image pickup element 100 has a pixel array unit 20 composed by arranging pixels 210 in m columns lengthwise and n rows crosswise in a matrix manner, a row scanning circuit 30, a column scanning circuit 40, and a timing control circuit 50.

Also, the solid-state image pickup element 100 is provided with an ADC 60-0 to an ADC 60-m provided while corresponding to the respective columns in the pixel array unit 20 and a reference signal generation unit 70 for supplying a reference voltage RAMP for the A/D conversion to the ADC 60-0 to the ADC 60-m. The ADC 60-0 to the ADC 60-m are respectively provided with a comparator (REF) 601-0 to a comparator 601-m and a latch unit 602-0 to a latch unit 602-m.

The solid-state image pickup element 100 further has a sense amplifier 80 and a capturing unit 90. It should be noted that in FIG. 1, although only the latch unit 602-0 to the latch unit 602-m are illustrated only in one row, but in actuality, it is supposed that these are lined up and arranged in a column direction by the number of output bits (10 bits, 12 bits, or the like). To elaborate, while corresponding to these, a plurality of pairs of the sense amplifier 80 and the capturing unit 90 are also arranged.

The respective pixels 210 in the pixel array unit 20 are connected to row selection lines Hi and column selection lines Vj (i and j are both natural numbers). The row scanning circuit 30 selects the row selection line Hi where read of a pixel value is desired to be performed among the row selection lines H0 to Hn. The column scanning circuit 40 selects the column selection line Vj where a pixel value is desired to be read in the row selection line Hi selected by the row scanning circuit 30. The timing control circuit 50 generates an internal clock on the basis of an input control clock to be output to the row scanning circuit 30, the column scanning circuit 40, the ADC 60-0 to the ADC 60-m, the reference signal generation unit 70, and the like.

It should be noted that in the following description, in a case where it is not necessary to respectively individually distinguish the ADC 60-0 to the ADC 60-m from each other, these are simply referred to as ADC 60, and in a case where it is not necessary to individually distinguish the comparator (REF) 601-0 to the comparator 601-m from each other, these are simply referred to as comparator 601. Furthermore, in a case where it is not necessary to individually distinguish the latch unit 602-0 to the latch unit 602-m from each other, these are simply referred to as latch unit 602.

The comparator 601 of the ADC 60 compares the reference voltage RAMP input from the reference signal generation unit 70 with an output value of the pixel 210 transmitted through the column selection line Vj and performs an output by inverting a phase of the output signal when the magnitudes of the reference voltage RAMP and the output value of the pixel 210 are matched with each other.

The latch unit 602 continuously counts the number of clocks until the output of the comparator 610 is changed and holds a digital count value in accordance with a comparison period when the output of the comparator 610 is changed. The count value held by the latch unit 602 is scanned by the column scanning circuit 40 and sequentially extracted by two-phase bus lines B10 and B20. The count values extracted by the two-phase bus lines B10 and B20 exist as differential signals whose phases are mutually inverse.

The sense amplifier 80 functioning as an amplification unit amplifies the differential signals input through the bus line B10 and the bus B20 to be output to the capturing unit 90. The capturing unit 90 is composed, for example, of a flip-flop circuit and latches the output from the sense amplifier 80 in synchronism with a supplied control clock. The value (pixel value) latched by the sense amplifier 80 is output to an output data processing circuit which is not shown in the drawing in synchronism with the control clock.

Incidentally, in the solid-state image pickup element 100 shown in FIG. 1, because of a difference in physical distances from a plurality of latch unit 602 to the sense amplifier 80, a problem occurs in which a deviation is generated in the data capturing timings in the sense amplifier 80. To elaborate, a time until the signal of the pixel value is supplied from the respective latch units 602 lined up and arranged by the number of pixels in the column direction to the sense amplifier 80 depends on distances of the bus lines B10 and B20 where the signal is transmitted. For this reason, a difference is generated between a timing for capturing output data from the latch unit 602-m located at a position closest from the sense amplifier 80 (near end) and a timing for capturing output data from the latch unit 602-0 located at a position farthest from the sense amplifier (far end).

When the data is latched by the capturing unit 90, a hold time is tight with respect to the data at the near end, and a set up time is tight with respect to the data at the far end. For this reason, depending on a magnitude of the deviation in the capturing timings because of the far and near end differences, the data may be captured out of synchronization by one pixel.

Also, there is a possibility that a difference may be generated in a time for the data to be transmitted through the bus line B10 and the bus line B20 depending on a variation at the time of a process of a semiconductor chip constituting this circuit. Up to now, a capturing period is uniformly set without taking such variation into account, and thus, both the data output from the far end and the data output from the near end cannot be captured within a predetermined period in some cases.

Furthermore, the time for the data to be transmitted through the bus line B10 and the bus line B20 also depends on a fluctuation of a power supply voltage and a change in temperature. Also, in recent years, realization of a higher definition of an image and a faster frame rate is advanced, and along with this, a time allowed to capture data on one pixel is being shortened. To elaborate, an allowable amount with respect to the deviation in the data capturing timings by the sense amplifier 80 is also being narrowed.

The capturing timing can also be adjusted by changing a mask, and according to this, it is possible to set different values for each chip. However, it takes considerable labor hours to perform these, and it is conceivable that the execution is difficult.

The present invention has been made in view of the above-mentioned points, and it is an object to make it possible to appropriately set the capturing timing for the pixel value.

DISCLOSURE OF INVENTION

A solid-state image pickup element of the present invention is provided with a pixel array unit composed of pixels arranged in a row direction and a vertical direction in a matrix manner and a latch unit provided for each column constituting the pixel array unit and configured to convert a pixel value of the pixel into a digital pixel value to hold the pixel value. Also, the solid-state image pickup element is provided with a column scanning unit for selecting the latch unit through a column scanning, a capturing unit for sequentially capturing the pixel value held by the latch unit selected by the column scanning circuit in synchronism with a predetermined clock, and a delay unit for delaying the clock for driving the capturing unit in a plurality of stages. With the configuration described above, first dummy data is set in a latch unit at a near end which is most adjacent to the capturing unit, and second dummy data is set in a latch unit at a far end which is furthest from the capturing unit. Then, a delay amount in the delay unit 10 is set as a delay amount at which both the first dummy data and the second dummy data can be captured by the capturing unit.

Based on this, the capturing timing of the capturing unit is set as the timing at which both the dummy data output from the far end and the dummy data output from the near end can be captured.

According to the present invention, as the capturing timing of the capturing unit is set as the timing at which both the dummy data output from the far end and the dummy data output from the near end can be captured, the operation margin of the solid-state image pickup element is improved.

BEST MODES FOR CARRYING OUT THE INVENTION

Hereinafter, embodiments of the present invention will be described with reference to FIGS. 1 to 8. The present embodiments will be described in the following order.

1. First Embodiment [Basic Configuration Example]
2. Second Embodiment [Example of Simultaneously Executing a Measurement of a Data Capturing Timing from a Near End and a Measurement of a Data Capturing Timing from a Far End]

<First Embodiment>
[Apparatus Overall Configuration Example]

Figure 1:
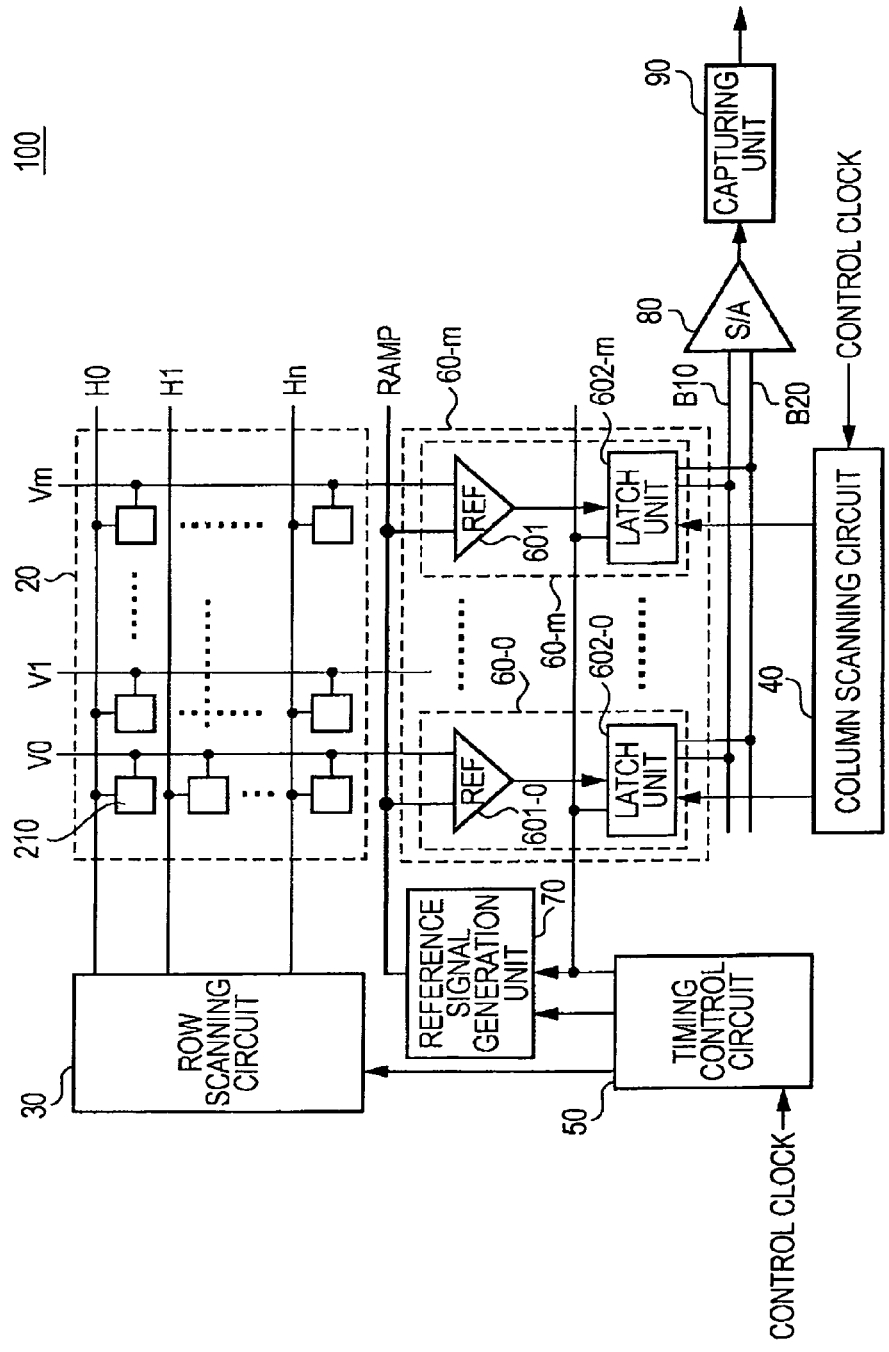
FIG. 1 is a block diagram showing a configuration example of a conventional solid-state image pickup element.
Figure 2:
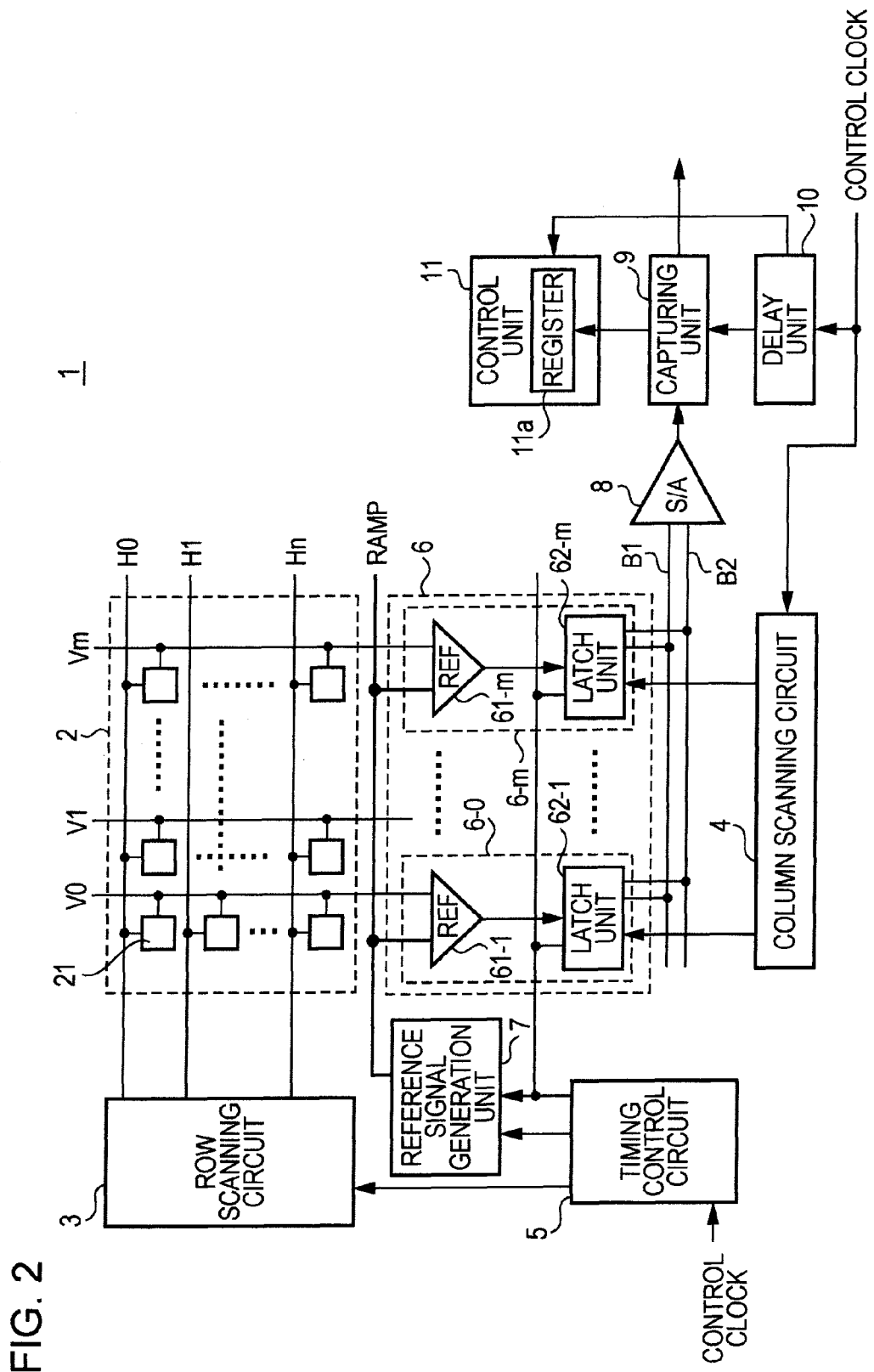
FIG. 2 is a block diagram showing a configuration example of a solid-state image pickup element according to a first embodiment of the present invention.

FIG. 2 is a block diagram showing a configuration example of a solid-state image pickup element according to a first embodiment. A solid-state image pickup element 1 shown in FIG. 2 has a pixel array unit 2 composed by arranging pixels 21 in m columns lengthwise and n rows crosswise in a matrix manner, a row scanning circuit 3, a column scanning circuit 4, and a timing control circuit 5.

Also, the solid-state image pickup element 1 is provided with an ADC 6-0 to an ADC 6-m provided while corresponding to the respective columns of the pixel array unit 2 and a reference signal generation unit 7 for supplying a reference voltage RAMP for the A/D conversion to the ADC 6-0 to the ADC 6-m. The ADC 6-0 to the ADC 6-m are respectively provided with a comparator (REF) 61-0 to a comparator 61-m and a latch unit 62-0 to a latch unit 62-m.

The solid-state image pickup element 1 further has a sense amplifier 8, the capturing unit 9, a delay unit 10, and a control unit 11. In FIG. 2 also, as in FIG. 1, the latch unit 62-0 to the latch unit 62-m are illustrated only in one row, but in actuality, it is supposed that these are lined up and arranged in a column direction by the number of output bits. Therefore, while corresponding to these, a plurality of pairs of the sense amplifier 8 and the capturing unit 9 are also arranged.

The respective pixels 21 in the pixel array unit 2 are connected to row selection lines Hi and column selection lines Vj (i and j are both natural numbers). The row scanning circuit 3 selects the row selection line Hi where read of a pixel value is desired to be performed among the row selection lines H0 to Hn. The column scanning circuit 4 selects the column selection line Vj where a pixel value is desired to be read in the row selection line Hi selected by the row scanning circuit 3. The timing control circuit 5 generates an internal clock on the basis of an input control clock to be output to the row scanning circuit 3, the column scanning circuit 4, the ADC 6-0 to the ADC 6-m, the reference signal generation unit 7, and the like.

It should be noted that in the following description, in a case where it is not necessary to respectively individually distinguish the ADC 6-0 to the ADC 6-m from each other, these are simply referred to as ADC 6, and in a case where it is not necessary to individually distinguish the comparator 61-0 to the comparator 61-m from each other, these are simply referred to as comparator 61. Furthermore, in a case where it is not necessary to individually distinguish the latch unit 62-0 to the latch unit 62-m from each other, these are simply referred to as latch unit 62.

The comparator 61 of the ADC 6 compares the reference voltage RAMP input from the reference signal generation unit 7 with an output value of the pixel 21 transmitted through the column selection line Vj and performs an output by inverting a phase of the output signal when the magnitudes of the reference voltage RAMP and the output value of the pixel 21 are matched with each other.

The latch unit 62 continuously counts the number of clocks until the output of the comparator 61 is changed and holds a digital count value in accordance with a comparison period when the output of the comparator 61 is changed. The count value held by the latch unit 62 is scanned by the column scanning circuit 4 and sequentially extracted by two-phase bus lines B1 and B2 to be set as differential potentials.

The sense amplifier 8 amplifies the differential potentials input through the bus line B1 and the bus line B2 to be output to the capturing unit 9. The capturing unit 9 is composed, for example, of a flip-flop circuit and latches the output from the sense amplifier 8 in synchronism with a supplied control clock. The pixel value latched by the sense amplifier 8 is output to an output data processing circuit which is not shown in the drawing in synchronism with the control clock. The configuration described up to now except for the delay unit 10 is basically the same as the conventional configuration described by using FIG. 1.

Figure 3:
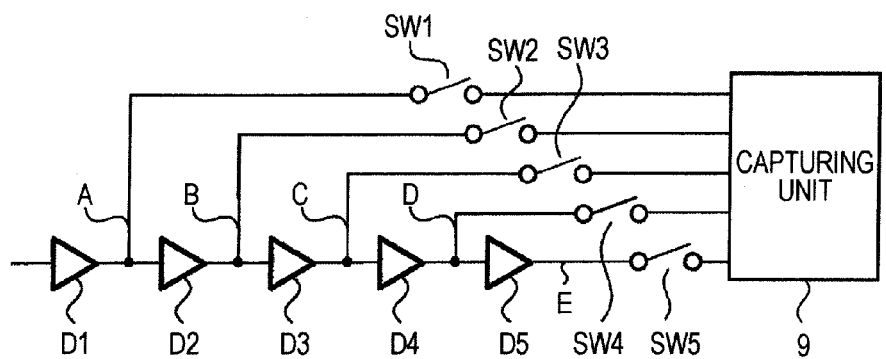
FIG. 3 is an explanatory diagram showing a configuration example of a delay unit according to the first embodiment of the present invention.

Then, according to the present embodiment, a configuration is set in which the control clock input to the capturing unit 9 is supplied via the delay unit 10. The delay unit 10 adjusts the capturing timing for the data by delaying the control clock for instructing the data capturing timing in the capturing unit 9. A delay amount added at the delay unit 10 can be adjusted in a plurality of stages with a step smaller than one clock cycle of the control clock. FIG. 3 shows a configuration example of the delay unit 10. The delay unit 10 shown in FIG. 3 is configured to be able to adjust the delay amount of the control clock in five stages. It should be noted that .a setting interval of the delay amount is not limited to the five stages and may also be set as stages such as six stages and seven stages.

The delay unit 10 constitutes a delay line by a delay element D1 to a delay element D5 connected in series. The respective delay elements D are constituted, for example, by connecting two inverter elements in series. A line A to a line E for extracting the outputs of the respective delay element D1 to delay element D5 are respectively provided with a switch SW1 to a switch SW5, and when one of these switches SW is selectively connected, the delay amount of the signal input to the capturing unit 9 is changed.

For example, in a case where the switch SW3 is turned ON and the other switches SW are turned OFF, through the line C where the switch SW3 is provided, the control clock to which the delay is added by the delay element D1, the delay element D2, and the delay element D3 is transmitted to the capturing unit 9. Also, in a case where the switch S5 is turned ON and the other switches SW are turned OFF, through the line E where the switch SW5 is provided, the control clock to which the delay is added by the delay element D1 to the delay element D5 is transmitted to the capturing unit 9.

It should be noted that in the present example, the delay element D1 to the delay element D5 are composed of the two-stage inverter elements but may also be composed of a flip-flop circuit or the like. In the case of the configuration by the flip-flop circuit, it is also possible to add a delay equal to or larger than one clock cycle.

The control unit 11 adjusts the delay amount in the delay unit 10 by switching ON and OFF of the switch SW1 to the switch SW5. Such adjustment of the delay amount by the delay unit 10 is performed only in a case where the dummy data for a test is input. The test herein refers to the measurement on the capturing timing by the sense amplifier 8. Also, the control unit 11 is provided with a register 11a functioning as a storage unit therein, and the register 11a stores a data capturing result or the like in the capturing unit 9.

The transmission of the dummy data for the test is set to be performed by using the bus lines B1 and B2 used for the transmission of the pixel signal. The input of the dummy data is set to be performed in a non-effective period when the transfer of the pixel value is not performed.

Figure 4:
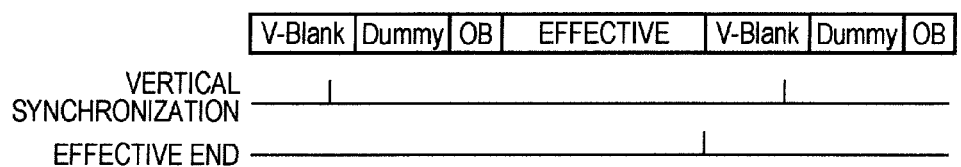
FIG. 4 is a timing chart showing an example of a transmission timing for dummy data according to the first embodiment of the present invention.

FIG. 4 shows an output timing diagram for a video signal in a case of being viewed in a frame cycle. As shown in FIG. 4, a scanning in the column scanning circuit 4 (see FIG. 2) is performed in synchronism with a vertical synchronism signal, and with that, a vertical blanking signal (V-Blank), a dummy pixel (Dummy), an optical black pixel (OB), and an effective pixel are input to the sense amplifier 8 in sequence. The dummy pixel (Dummy), the optical black pixel (OB), and the effective pixel are used for the video signal, and during a period when these pixels are output, the dummy data cannot be transmitted. Therefore, during a period when these are not transferred, herein, during a vertical blanking period, to elaborate, within an output period of the vertical blanking signal, the transmission of the dummy data is performed.

It should be noted that the transmission of the dummy data during the vertical blanking period may also be performed for every frame at the time of an image pickup. Also, the transmission may also be performed only during a period of measuring the capturing timing, that is, for example, may also be performed only at the time of power supply activation, at the time of standby, at the time of return from the standby state, or the like. Alternatively, as a configuration enabling a user operation for instructing to perform the timing adjustment, a configuration may also be set in which the timing of putting in the dummy data is instructed by the user.

According to the present embodiment, the investigation on the capturing timing for the dummy data in the sense amplifier 8 is set to be performed in two separate occasions in a case where the dummy data is output from the latch unit 62-m at the near end and in a case where the dummy data is output from the latch unit 62-0 at the far end. The investigation on the capturing timing, for the dummy data is performed while the capturing timing of the capturing unit 9 is shifted stepwise by the delay unit 10 by determining whether or not the dummy data is captured in the respective timings. Information as to whether or not the dummy data is captured (measurement result) is stored in the register 11a or the like. Then, the measurement result stored in the register 11a is referred to, and the timing at which both the data at the far end can be captured is set as the capturing timing in the capturing unit 9.

Figure 5:
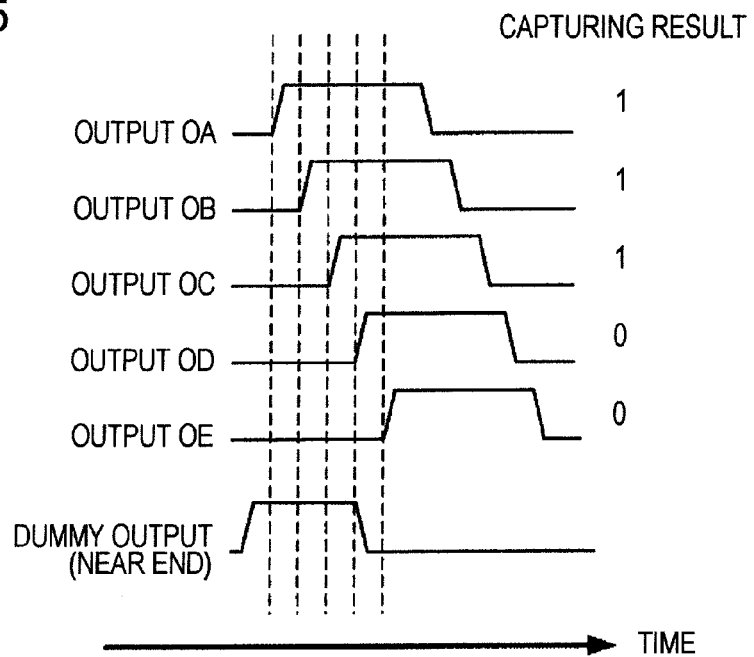
FIG. 5 is a timing chart showing examples of a timing at which the dummy data is output from a latch unit at a near end and an output timing for a control clock delayed by the delay unit according to the first embodiment of the present invention.

FIG. 5 shows examples of a timing at which the dummy data is output from the latch unit 62-m at the near end and an output timing for a control clock delayed by the delay unit 10. A waveform denoted by "OUTPUT OA" on the uppermost stage of FIG. 5 is a waveform of the control clock input from the delay unit 10 to the column scanning circuit 4 in a state in which only the switch SW1 is connected in the delay unit 10 and the other switch SW2 to switch SW5 are turned OFF. To elaborate, the waveform is a waveform of the control clock to which the delay is added only by the delay element D1.

Similarly, a waveform denoted by "OUTPUT OB" is a waveform of the control clock to which the delay is added by the delay element D1 and the delay element D2, and a waveform denoted by "OUTPUT OC" is a waveform of the control clock to which the delay is added by the delay element D1, the delay element D2, and the delay element D3. Also, a waveform denoted by "OUTPUT OD" is a waveform of the control clock to which the delay is added by the delay element D1 to the delay element D4, and a waveform denoted by "OUTPUT OE" is a waveform of the control clock to which the delay is added by the delay element D1 to the delay element D5.

In the capturing unit 9, the data capturing is performed at the time of the rise of the control clock. Therefore, in the example shown in FIG. 5, and at the timing when the capturing is performed on the basis of the control clocks "OUTPUT OA", "OUTPUT OB", and "OUTPUT OC" output within the output period for the dummy data, the dummy data is captured by the capturing unit 9. Then, in the capturing timings for the "OUTPUT OD" and the "OUTPUT OE", the dummy data is not captured.

Whether the capturing is performed or not is represented by, for example, one bit of 1 and 0 and stored in the register 11a while the respective delay amounts are associated with the capturing results. When the delay amounts corresponding to the "OUTPUT OA" to the "OUTPUT OE" are respectively set as a delay amount DA to a delay amount DE, in the example shown in FIG. 5, data such as the delay amount DA=1, the delay amount DB=1, the delay amount DC=1, the delay amount DD=0, and the delay amount DE=0 is stored in the register 11a.

Figure 6:
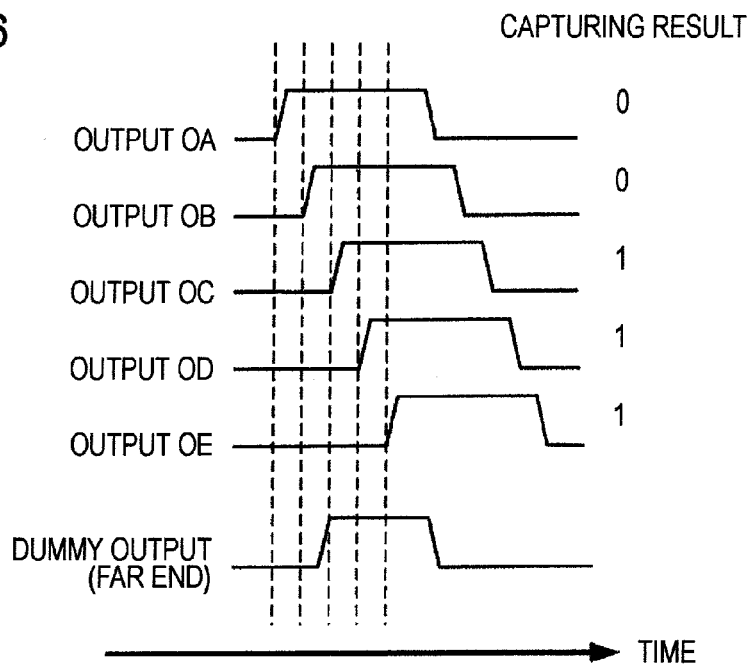
FIG. 6 is a timing chart showing examples of a timing at which the dummy data is output from a latch unit at a far end and an output timing for the control clock delayed by the delay unit according to the first embodiment of the present invention.

FIG. 6 shows examples of a timing at which the dummy data is output from the latch unit 62-1 at the far end and an output timing for a control clock delayed by the delay unit 10. Similarly as in FIG. 5, a waveform denoted by "OUTPUT OA" is a waveform of the control clock to which the delay is added only by the delay element D1, and a waveform denoted by "OUTPUT OB" is a waveform of the control clock to which the delay is added by the delay element D1 and the delay element D2. A waveform denoted by "OUTPUT OC" is a waveform of the control clock to which the delay is added by the delay element D1, the delay element D2, and the delay element D3, and a waveform denoted by "OUTPUT OD" is a waveform of the control clock to which the delay is added by the delay element D1 to the delay element D4. Furthermore, a waveform denoted by "OUTPUT OE" is a waveform of the control clock to which the delay is added by the delay element D1 to the delay element D5.

FIG. 6 shows that the capturing of the dummy data can be performed when the delay amount is set as the delay amount DC and when the delay amount is set as the delay amount DD. This results are also recorded in the register 11a while setting the delay amount DA=0, the delay amount DB=0, the delay amount DC=1, the delay amount DD=1, and the delay amount DE=1. According to the capturing result on the data from the near end shown in FIG. 5 and the capturing result on the data from the far end shown in FIG. 6, it is found out that the timing at which both the dummy data from the near end and the dummy data from the far end can be captured is a timing where the delay amount is set as DC. To elaborate, when the control clock is delayed by the delay amount DC, both the data sent from the near end and the data sent from the far end can be captured. It should be noted that in a case where the timing at which the capturing in the capturing unit 9 can be performed has a range such as "the delay amount DA to the delay amount DC", an intermediate point among them or the like may be set as the above-mentioned capturing timing in the capturing unit 9.

After such results are obtained, on the basis of the control of the control unit 11, the switch SW3 for setting the delay amount as DC in the delay unit 10 is turned ON, and the other switches SW are turned OFF. According to this, with respect to the control clock supplied to the capturing unit 9, the delay by the delay amount DC is constantly added. Therefore, the capturing timing in the capturing unit 9 is automatically set as the timing at which both the data sent from the near end and the data sent from the far end can be captured.

Also, although the illustration is omitted in FIG. 2, as described above, the plurality of capturing unit 9 are provided in actuality while corresponding to the number of output bits. Then, the delay by the delay unit 10 is configured to be added to all the control clocks supplied to the respective capturing units 9. Therefore, the change of the capturing timing is performed with respect to all the capturing units 9.

It should be noted that as the transfer times of the bus line B1 and the bus line B2 are changed also because of the temperature change or the fluctuation of the power supply voltage, after a certain time elapses after the above-mentioned adjustment is performed, the adjustment may also be performed again by using the technique in the present example.

[Effects by the First Embodiment]

According to the above-described first embodiment, the timing at which both the data output from the latch unit 62-m at the near end and the data output from the latch unit 62-0 at the far end can be captured is set as the capturing timing in the capturing unit 9. For this reason, all the pixel values from the near end to the far end can be accurately captured. This leads to a state in which the accurate capturing can be performed even the speed of the clock for driving the solid-state image pickup element is increased, and the drive at an even higher speed is realized.

Also, according to the above-described first embodiment, the timing at which both the data output from the latch unit 62-m at the near end and the data output from the latch unit 62-0 at the far end can be captured is decided on the basis of the actually conducted measurement results. To elaborate, also even in a case where the transfer speed of the data is changed due to the temperature change or the fluctuation of the power supply voltage, an optimal capturing timing in a state in which such a change is generated is set as a new capturing timing. Therefore, the capturing timing in the capturing unit 9 can be adjusted to the optimal timing while taking all the variation of the elements generated in the manufacturing process, the temperature change, the fluctuation of the power supply voltage, and the like into account.

Also, according to the above-described first embodiment, the adjustment on the capturing timing can be performed for each chip. Therefore, the design margin can also be improved.

Also, according to the above-described first embodiment, the setting on the capturing timing is automatically performed after the measurement on the capturing timing by the dummy data. According to this, the adjustment on the timing can be performed without the trouble.

Also, according to the above-described first embodiment, the adjustment on the capturing timing of the capturing unit 9 can also be periodically performed, and the deviation in the capturing timings generated after the adjustment on the timing can also be corrected as needed.

Also, according to the above-described first embodiment, as the transmission of the dummy data is performed by using the bus line B1 and the bus line B2 used for the transmission of the pixel values, it is not necessary to provide a new transmission path for realizing the capturing timing adjustment function. Furthermore, as the transmission of the dummy data is performed in the non-effective period for the video signal (the vertical blanking period), it is not necessary to separately provide a time for the timing adjustment.

Also, according to the above-described first embodiment, by constituting the delay element D of the delay unit 10 by the flip-flop circuit, even in a case where the capturing timing for the data output from the far end is delayed by equal to or larger than one clock cycle, it is possible to adjust the capturing timing.

[Second Embodiment]

Next, a second embodiment of the present invention will be described with reference to FIG. 7 and FIG. 8. According to the present embodiment, by using two pairs of bus lines, the output of the dummy data from the far end and the output of the dummy data from the near end are performed at the same time, and a timing at which both the dummy data can be captured is searched for. Then, the timing at which both the dummy data output from both the far end and the near end can be captured is newly set as the capturing timing in the capturing unit 9.

Figure 7:
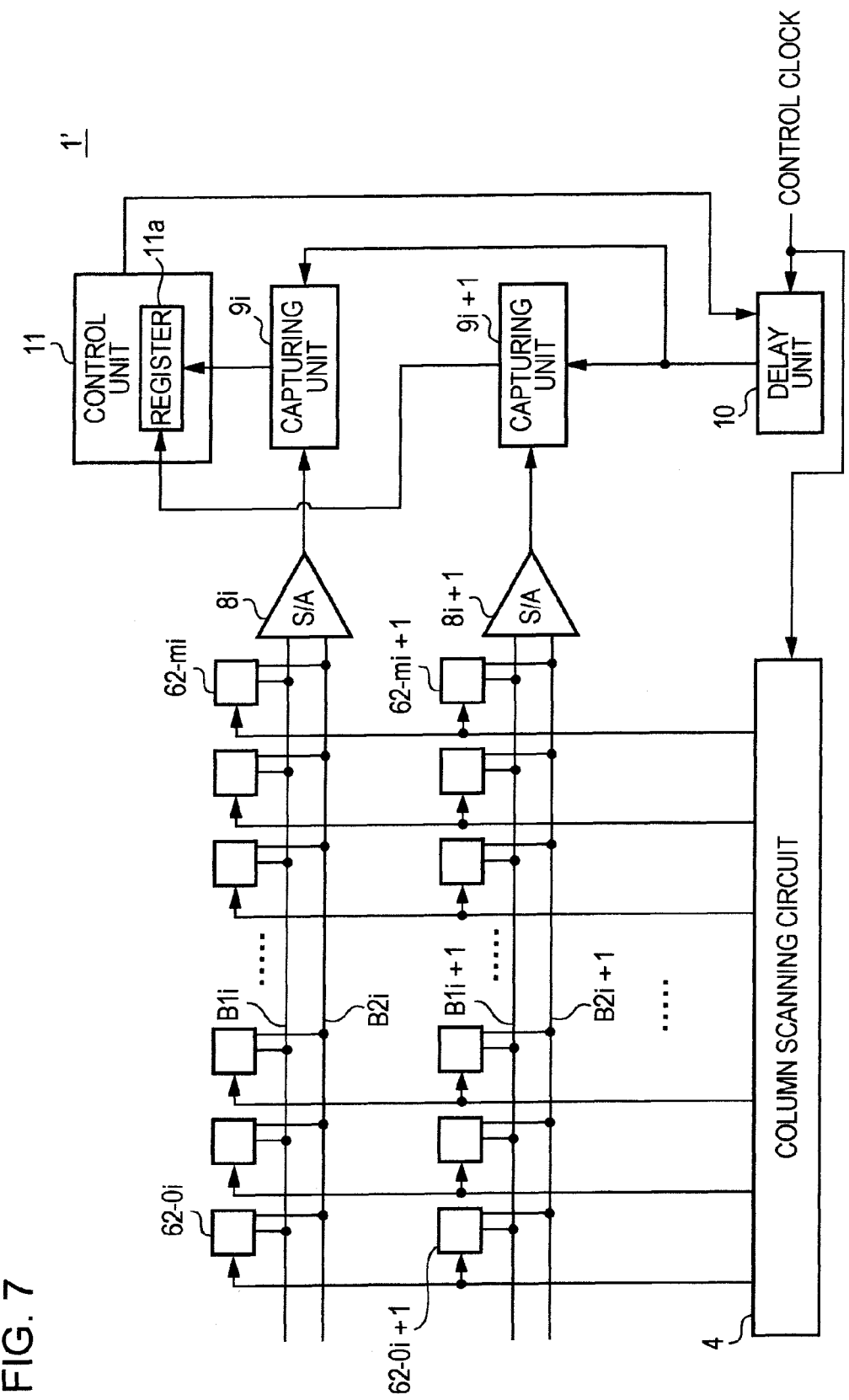
FIG. 7 is a block diagram showing a configuration example of a solid-state image pickup element according to a second embodiment of the present invention.

FIG. 7 is a block diagram showing a configuration example of a solid-state image pickup element 1' according to the present example. In FIG. 7, parts corresponding to FIG. 2 are assigned with the same reference symbols. Also, in FIG. 7, the illustrations of the pixel array unit 2, the row scanning circuit 3, the timing control circuit 5, and the comparator 61 are omitted.

FIG. 7 illustrates an i-th latch unit 62-0i to latch unit 62-mi and an i+1-th latch unit 62-0i+1 to latch unit 62-mi+1 among the latch units 62 provided while corresponding to the number of output bits. The latch unit 62-0i to the latch unit 62-mi are connected to bus lines B1i and B2i, and the latch unit 62-0i+1 to the latch unit 62-mi+1 are connected to a bus line B1i+1 and a bus line B2i+1.

The bus line B1i and the bus line B2i are connected to a sense amplifier 8i, and the sense amplifier 8i is connected to a capturing unit 9i. In such a configuration, the differential potential transmitted through the bus line B1i and the bus line B2i is amplified by the sense amplifier 8i and latched by a capturing unit 9i+1 to be output at a predetermined timing.

Also, the bus line B1i+1 and a bus line B2i+2 are connected to a sense amplifier 8i+1, and the sense amplifier 8i+1 is connected to the capturing unit 9i+1. In such a configuration, the differential potential transmitted through the bus line B1i+1 and the bus line B2i+1 is amplified by the sense amplifier 8i+1 and latched by the capturing unit 9i+1 to be output at a predetermined timing.

According to the present embodiment, on the bus line B1i and the bus line B2i, the dummy data is output from the latch unit 62-0i at the far end, and on the bus line B1i+1 and the bus line B2i+2, the dummy data is output from the latch unit 62-mi+1 at the near end. To elaborate, according to the first embodiment, the measurement on the capturing timing for the dummy data output from the near end and the measurement on the capturing timing for the dummy data output from the far end are separately performed, but according to the present example, the measurements are configured to be performed at the same time.

To the capturing unit 9i and the capturing unit 9i+1, the delay unit 10 is connected, and to the delay unit 10, the control unit 11 is connected. The delay unit 10 performs a shift on the phase of the input control clock in small steps on the basis of the control of the control unit 11. According to this, the capturing timings for the dummy data in the capturing unit 9i and the capturing unit 9i+1 are adjusted.

Then, at the time of the respective measurements on the capturing timings which are performed while the delay amount of the delay unit 10 is changed, the row scanning circuit 3 selects the latch unit 62-0 at the far end following the latch unit 62-m at the near end. According to this, at the time of the respective measurements on the capturing timings which are performed while the delay amount of the delay unit 10 is changed, the dummy data is transmitted to both the capturing unit 9i and the capturing unit 9i+1.

The control unit 11 includes the register 11a, and in the register 11a, the capturing results of the dummy data in the capturing unit 9i and the capturing unit 9i+1 are recorded.

Figure 8:
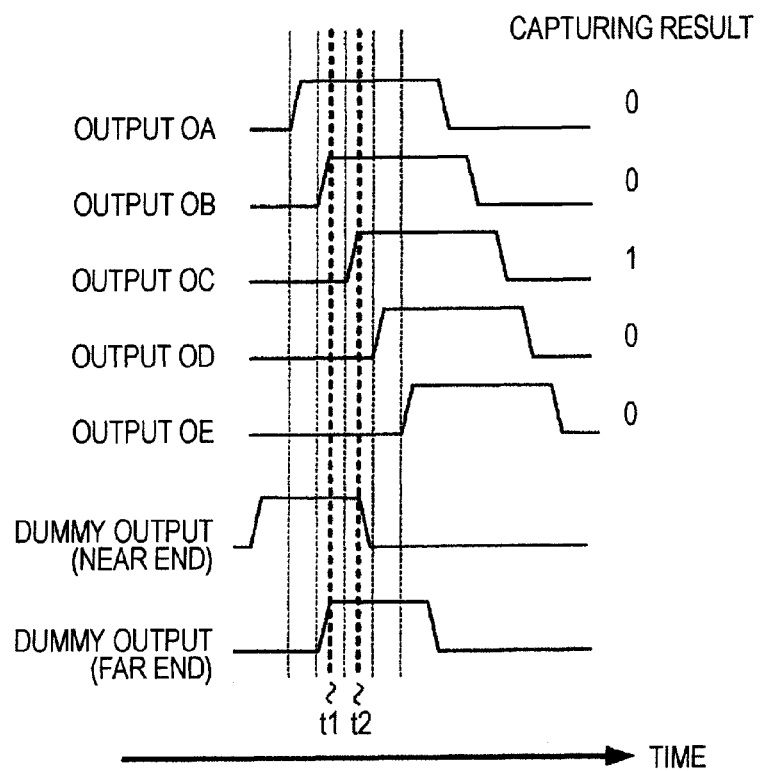
FIG. 8 is a timing chart showing examples of an output timing for the control clock delayed by the delay unit and timings at which the dummy data is output both at the near and far ends according to the second embodiment of the present invention.

FIG. 8 shows examples of an output timing for a control clock delayed by the delay unit 10 and an output timing for the dummy data at both the near end and the far end. The uppermost stage to row 5 represent output timings for the control clock, row 6 represents an output timing for the dummy data from the near end, and row 7 represents an output timing for the dummy data from the far end.

A waveform denoted by "OUTPUT OA" on the uppermost stage of FIG. 8 is a waveform of the control clock input from the delay unit 10 to the column scanning circuit 4 in a state in which only the switch SW1 is connected in the delay unit 10 and the other switch SW2 to switch SW5 are turned OFF. To elaborate, the waveform is a waveform of the control clock to which the delay is added only by the delay element D1.

Similarly, a waveform denoted by "OUTPUT OB" is a waveform of the control clock to which the delay is added only by the delay element D1 and the delay element D2, and a waveform denoted by "OUTPUT OC" is a waveform of the control clock to which the delay is added by the delay element D1, the delay element D2, and the delay element D3. Also, a waveform denoted by "OUTPUT OD" is a waveform of the control clock to which the delay is added by the delay element D1 to the delay element D4, and a waveform denoted by "OUTPUT OE" is a waveform of the control clock to which the delay is added by the delay element D1 to the delay element D5.

In the capturing unit 9i and the capturing unit 9i+1, the data capturing is performed at the time of the rise of the control clock. That is, the timing at which the dummy data respectively output from the far end and the near end can be captured at once is a timing at which the control clock rises during a period from the start of the output of the dummy data from the far end until the completion of the output of the dummy data from the near end.

In the example shown in FIG. 8, the control clock rising between the period from a timing t1 for the start of the output of the dummy data from the far end until a timing t2 for the completion of the output of the dummy data from the near end is only a control clock denoted by "OUTPUT C". Therefore, when a case where the capturing is performed is set as 1, a case where the capturing is not performed is set as 0, and the delay amounts corresponding to "OUTPUT OA" to "OUTPUT OE" are respectively set as the delay amount DA to the delay amount DE, the data recorded in the register 11a is as follows: the delay amount DA=0, the delay amount DB=0, the delay amount DC=1, the delay amount DD=0, and the delay amount DE=0.

After such results are obtained, on the basis of the control of the control unit 11, the switch SW3 for setting the delay amount in the delay unit 10 as DC is turned ON, and the other switches SW are turned OFF. According to this, with respect to the control clock supplied to the capturing unit 9, the delay by the delay amount DC is constantly added. Therefore, the capturing timing in the capturing unit 9 is set as the timing at which both the data sent from the near end and the data sent from the far end can be captured.

[Effects by the Second Embodiment]

According to the above-described second embodiment of the present invention, in addition to the effects of the first embodiment, the effects in which the capturing timing for the data output from the near end and the capturing timing for the data output from the far end can be measured at the same time are attained. Also, according to this, the size of the storage area for the measurement results in the register 11a can be suppressed to the minimum.

[Examples of Applying the Configurations of the Respective Embodiments to a Camera System]

It should be noted that the solid-state image pickup element 1 (1') having such an effect can be applied as an image pickup device for a digital camera or a video camera.

Figure 9:
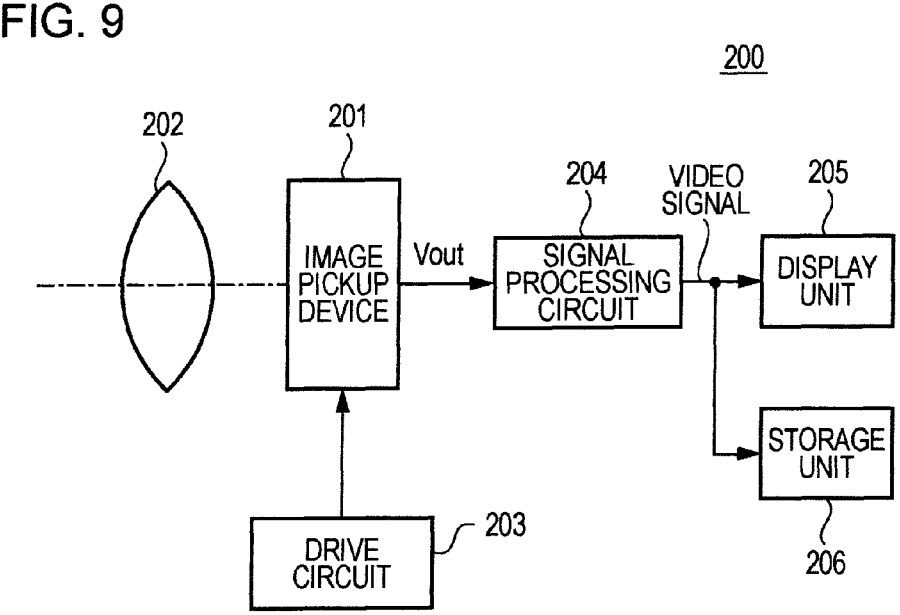
FIG. 9 is a block diagram showing a configuration example in a case where the solid-state image pickup element according to the embodiment of the present invention is applied to a camera system.

FIG. 9 shows a configuration example of a camera system to which the solid-state image pickup element according to the embodiment of the present invention is applied.

A camera system 200 shown in FIG. 9 has an image pickup device 201 where the solid-state image pickup element 1 according to the present embodiment can be applied and a lens 202 for imaging an image light of an object on an image pickup surface of this image pickup device 201. Furthermore, the camera system has a drive circuit 203 for driving the image pickup device 201, a signal processing circuit 204 for processing an output signal of the image pickup device 201, a display unit 205, and a storage unit 206.

The drive circuit 203 has a timing generator (not shown in the drawing) for generating various timing signals including a start pulse and a clock pulse for driving a circuit in the image pickup device 201 and drives the image pickup device 201 at a predetermined timing signal.

The signal processing circuit 204 applies a signal processing such as a CDS (Correlated Double Sampling) on the output signal of the image pickup device 201. The video signal processed by the signal processing circuit 204 is projected as video on the display unit 205 composed of a liquid crystal display or the like and also recorded, for example, in the storage unit 206 constructed by a memory or the like.

As described above, in the image pickup apparatus such as a digital still camera, by mounting the above-mentioned solid-state image pickup element 1 as the image pickup device 201, it is possible to realize a high precision camera.

It should be noted that in addition to the above-mentioned configurations of the respective embodiments, a second delay unit for adjusting the timing for the column scanning by the column scanning circuit 4 may be provided. In such a configuration, at the time of an initial evaluation, after the output timing for the dummy data is delayed by the second delay unit, by performing the investigation on the capturing timing, it is possible to measure the operation margin of the solid-state image pickup element 1.

EXPLANATION OF REFERENCE NUMERALS 1, 1' solid-state image pickup element, 2 pixel array unit, 21 pixel, 3 row scanning unit, 4 column scanning unit, 5 timing control circuit, 6-0 to 6-m ADC, 7 reference signal generation unit, 8, 8i sense amplifier, 9, 9i capturing unit, 10 delay unit, 11 control unit, 11a register, 20 pixel array unit, 21 pixel, 30 row scanning circuit, 40 column scanning circuit, 50 timing control circuit, 60 ADC, 61-0 to 61-m comparator, 62-0 to 62-m latch unit, 70 reference signal generation unit, 80 sense amplifier, 90 capturing unit, 100 solid-state image pickup element, 200 camera system, 201 image pickup device, 202 lens, 203 drive circuit, 204 signal processing circuit, 205 display unit, 206 storage unit, 601 comparator, 602 latch unit, B1, B1i, B2, B2i, B10, B20 bus line, C line, D1 to D5 delay element, E line, H0, Hi row selection line, RAMP reference voltage, S5, SW1 to SW5 switch, Vj column signal line

The invention claimed is:

1. A solid-state image pickup element comprising:
a pixel array unit composed of pixels arranged in a row direction and a vertical direction in a matrix manner;
a latch unit provided for each column constituting the pixel array unit and configured to convert a pixel value of the pixel into a digital pixel value to hold the pixel value;
a column scanning unit for selecting the latch unit through a column scanning;
a capturing unit for sequentially capturing the pixel value held by the latch unit selected by the column scanning unit in synchronism with a predetermined clock;
a delay unit for delaying the clock for driving the capturing unit in a plurality of stages; and
a control unit for setting first dummy data in a latch unit at a near end which is most adjacent to the capturing unit among the latch units, setting second dummy data in a latch unit at a far end which is farthest from the capturing unit among the latch units, and setting a delay amount in the delay unit as a delay amount at which both the first dummy data and the second dummy data can be captured by the capturing unit.

2. The solid-state image pickup element according to claim 1,
wherein the control unit includes a storage unit for storing each of the delay amounts in the plurality of stages added to the clock by the delay unit and information as to whether the first and second dummy data can be captured or not in a case where capturing in the capturing unit is performed on the basis of the control clock to which the respective delay amounts in the plurality of stages are added, and
the delay amount stored in the storage unit at which the first and second dummy data can be captured is set in the delay unit, and the clock delayed by the delay amount is supplied to the capturing unit.

3. The solid-state image pickup element according to claim 2,
wherein a transmission of the dummy data is performed within a vertical blanking period.

4. The solid-state image pickup element according to claim 3, further comprising:
a transmission line for transmitting the pixel value held by the latch unit as a differential signal; and
an amplification unit connected to an end part of the transmission line and configured to amplify and output the differential signal.

5. The solid-state image pickup element according to claim 4, wherein the delay unit adds a delay to the clock by changing the delay amount in a step smaller than one cycle of the clock.

6. The solid-state image pickup element according to claim 5, wherein the storage unit stores information as to whether the first dummy data output from the latch unit at the near end can be captured or not and information as to whether the second dummy data output from the latch unit at the far end can be captured or not.

7. The solid-state image pickup element according to claim 2,
wherein a transmission of the dummy data is performed at any one of timings including a time of power supply activation, a time of standby, a time of returning from a standby state, and a timing instructed by a user.

8. A data transfer circuit comprising:
a latch unit for holding a pixel value transferred from a pixel array unit composed of pixels arranged in a row direction and a vertical direction in a matrix manner;
a capturing unit for capturing the pixel value held by the latch unit;
a delay unit for delaying a clock for driving the capturing unit in a plurality of stages; and
a control unit for setting first dummy data in a latch unit at a near end which is most adjacent to the capturing unit among the latch units, setting second dummy data in a latch unit at a far end which is farthest from the capturing unit among the latch units, and setting a delay amount in the delay unit as a delay amount at which both the first dummy data and the second dummy data can be captured by the capturing unit.

9. A camera system comprising:
a solid-state image pickup element including
a pixel array unit composed of pixels arranged in a row direction and a column direction in a matrix manner on an image pickup surface and configured to obtain a pixel value corresponding to an image light imaged on the image pickup surface via a lens,
a latch unit provided for each column constituting the pixel array unit and configured to convert the pixel value of the pixel into a digital pixel value to hold the pixel value and also hold inputted dummy data,
a column scanning unit for selecting the latch unit through a column scanning,
a capturing unit for sequentially capturing the pixel value held by the latch unit selected by the column scanning unit in synchronism with a predetermined clock,
a delay unit for delaying the clock for driving the capturing unit in a plurality of stages, and
a control unit for setting first dummy data in a latch unit at a near end which is most adjacent to the capturing unit among the latch units, setting second dummy data in a latch unit at a far end which is farthest from the capturing unit among the latch units, and setting a delay amount in the delay unit as a delay amount at which both the first dummy data and the second dummy data can be captured by the capturing unit; and
a signal processing unit for obtaining a video signal on the basis of the pixel value captured by the capturing unit.

* * * * *